(12) United States Patent
Frid et al.

(10) Patent No.: US 10,802,744 B2
(45) Date of Patent: Oct. 13, 2020

(54) UPDATING MAPPING INFORMATION DURING SYNCHRONIZATION OF MEMORY DEVICE

(71) Applicant: WESTERN DIGITAL TECHNOLOGIES, INC., San Jose, CA (US)

(72) Inventors: Marina Frid, Jerusalem (IL); Igor Genshaft, Bat Yam (IL)

(73) Assignee: Western Digital Technologies, Inc., San Jose, CA (US)

(*) Notice: Subject to any disclaimer, the term of this patent is extended or adjusted under 35 U.S.C. 154(b) by 0 days.

(21) Appl. No.: 16/449,797

(22) Filed: Jun. 24, 2019

(65) Prior Publication Data
US 2020/0081645 A1 Mar. 12, 2020

Related U.S. Application Data

(60) Provisional application No. 62/728,027, filed on Sep. 6, 2018.

(51) Int. Cl.
*G06F 3/06* (2006.01)
*G06F 12/02* (2006.01)

(52) U.S. Cl.
CPC .......... *G06F 3/0646* (2013.01); *G06F 3/0605* (2013.01); *G06F 3/0688* (2013.01); *G06F 12/0238* (2013.01); *G06F 2212/7201* (2013.01)

(58) Field of Classification Search
None
See application file for complete search history.

(56) References Cited

U.S. PATENT DOCUMENTS

| | | | | |
|---|---|---|---|---|
| 5,630,093 A | * | 5/1997 | Holzhammer | G06F 3/0601 711/115 |
| 2016/0335006 A1 | * | 11/2016 | Rose | G06F 3/0688 |
| 2016/0378337 A1 | * | 12/2016 | Horspool | G06F 3/064 711/103 |

* cited by examiner

*Primary Examiner* — Kevin Verbrugge
(74) *Attorney, Agent, or Firm* — Arent Fox LLP (57) ABSTRACT

Disclosed herein are related to a controller, a method, and a system for updating mapping information between a logical address and a physical address of a corresponding region of a memory device. In one aspect, the controller generates a plurality of entries, where each entry indicates an update in the mapping information associated with the corresponding region. The controller generates a plurality of headers, where each header is associated with one or more entries in the corresponding region. The controller receives an instruction to synchronize the mapping information stored on the memory device with the update in the mapping information. The controller generates a copy of the plurality of headers in response to receiving the instruction to synchronize. The controller synchronizes the mapping information stored on the memory device according to the copy of the plurality of headers and the plurality of entries.

20 Claims, 5 Drawing Sheets

| | Copy of Headers 330 | Headers 320 | | | | | |
|---|---|---|---|---|---|---|---|
| Region 0 | 2 items | 2 items | E00 | E01 | | | |
| Region 1 | 3 items | 3 items | E10 | E11 | E12 | | |
| Region 2 | 4 items | 4 items | E20 | E21 | E22 | E23 | |
| Region 3 | 2 items | 2 items | E30 | E31 | | | |
| Region 4 | 3 items | 3 items | E40 | E41 | E42 | | |

FIG. 4B

| | Copy of Headers 330 | Headers 320 | | | | | |
|---|---|---|---|---|---|---|---|
| Region 0 | 2 items | 2 items | E00 | E01 | | | |
| Region 1 | 3 items | 4 items | E10 | E11 | E12 | E13 | |
| Region 2 | 4 items | 4 items | E20 | E21 | E22 | E23 | |
| Region 3 | 2 items | 5 items | E30 | E31 | E32 | E33 | E34 |
| Region 4 | 3 items | 6 items | E40 | E41 | E42 | E43 | E44 | E45 |

FIG. 4C

| | Headers 320 | | | | | |
|---|---|---|---|---|---|---|
| Region 0 | 2 items | E00 | E01 | | | |
| Region 1 | 4 items | E10 | E11 | E12 | E13 | |
| Region 2 | 4 items | E20 | E21 | E22 | E23 | |
| Region 3 | 5 items | E30 | E31 | E32 | E33 | E34 |
| Region 4 | 6 items | E40 | E41 | E42 | E43 | E44 | E45 |

UPDATING MAPPING INFORMATION DURING SYNCHRONIZATION OF MEMORY DEVICE

CROSS REFERENCE TO RELATED APPLICATION(S)

This application claims the benefit of U.S. Provisional Application Ser. No. 62/728,027, entitled "UPDATING MAPPING INFORMATION DURING SYNCHRONIZATION OF MEMORY DEVICE" and filed on Sep. 6, 2018, which is expressly incorporated by reference herein in its entirety.

BACKGROUND

Field

This disclosure is generally related to electronic devices and more particularly to data storage devices.

Background

Data storage devices enable users to store and retrieve data. Examples of data storage devices include volatile memory devices and non-volatile memory devices. A non-volatile memory generally retains data after a power-down event, while a volatile memory generally loses data after a power-down event. An example of a non-volatile memory is a flash memory.

A data storage device may store control information associated with data. For example, a data storage device may maintain a management table that includes a mapping of logical addresses to physical addresses.

In some implementations, the management table is maintained in a volatile memory of a controller of a data storage device. The data storage device may synchronize the management table at the volatile memory and may periodically send the management table to a non-volatile memory of the data storage device, for example, to back up the management table.

Synchronizing or backing up a management table uses resources of a data storage device. For example, certain flash storage devices may block operations to update a management table while the management table is being stored to the non-volatile memory, thereby reducing throughput. If certain operations involving the non-volatile memory are not blocked while the management table is stored to the non-volatile memory, a race condition between synchronizing of the management table and updating of the management table may exist. In some circumstances, such a race condition may result in inconsistencies in the synchronized data. Such inconsistencies may reduce performance of the data storage device, potentially resulting in lost data.

SUMMARY

Various embodiments of a device for storing data are disclosed herein. The device includes a memory device divided into a plurality of regions. The memory device is configured to store content data and mapping information between a logical address and a physical address of a corresponding region of the memory device. The device includes a controller coupled to the memory device. The controller is configured to generate a plurality of entries. Each entry indicates an update in the mapping information associated with the corresponding region. The controller is configured to generate a plurality of headers. Each header is associated with one or more entries in the corresponding region. The controller is configured to receive an instruction to synchronize the mapping information stored on the memory device with the update in the mapping information. The controller is configured to generate a copy of the plurality of headers in response to receiving the instruction to synchronize. The controller is configured to synchronize the mapping information stored on the memory device according to the copy of the plurality of headers and the plurality of entries.

In one or more embodiments, each header of the plurality of headers indicates a number of entries in the corresponding region.

In one or more embodiments, the controller is configured to receive an instruction to modify a region of the memory device while the mapping information is synchronized according to the copy of the plurality of headers and the plurality of entries, and generate an entry indicating a change in the mapping information associated with the modified region of the memory device, in response to the instruction to modify the region of the memory device.

In one or more embodiments, the controller is configured to update, during synchronization of the mapping information, a header indicating a number of entries associated with the modified region after the change in the mapping information.

In one or more embodiments, the controller is configured to maintain, during synchronization of the mapping information, a copy of the header indicating a number of entries associated with the modified region prior to the change in the mapping information.

In one or more embodiments, the controller is configured to remove the copy of the plurality of headers in response to completing synchronization of the mapping information stored on the memory device according to the copy of the plurality of headers and the plurality of entries.

In one or more embodiments, the device further includes another memory device coupled to the controller. The another memory device may be configured to store the plurality of entries and the plurality of headers. The memory device may comprise a non-volatile memory device and the another memory device may comprise a volatile memory device.

Various embodiments of a method of operating a memory device divided into a plurality of regions are disclosed herein. The method includes generating a plurality of entries. Each entry indicates an update in mapping information between a logical address and a physical address for a corresponding region of the memory device. The method includes generating a plurality of headers. Each header indicates a number of entries in the corresponding region. The method includes generating a copy of the plurality of headers. The method includes synchronizing the mapping information stored according to the copy of the plurality of headers and the plurality of entries. The method includes removing the copy of the plurality of headers in response to completing synchronization of the mapping information stored on the memory device according to the copy of the plurality of headers and the plurality of entries.

In one or more embodiments, the method includes storing the mapping information on the memory device, and storing the plurality of headers and the plurality of entries on another memory device.

In one or more embodiments, the memory device comprises a non-volatile memory device, and the another memory device comprises a volatile memory device.

In one or more embodiments, the method includes receiving an instruction to synchronize the mapping information according to the copy of the plurality of headers and the plurality of entries. The copy of the plurality of headers may be generated in response to the instruction to synchronize.

In one or more embodiments, the method includes receiving an instruction to modify a region of the memory device during synchronization of the mapping information according to the copy of the plurality of headers and the plurality of entries, and generating an entry indicating a change in the mapping information associated with the modified region of the memory device in response to the instruction to modify the region of the memory device.

In one or more embodiments, the method includes updating, while the mapping information is synchronized, a header indicating a number of entries associated with the modified region after the change in the mapping information.

In one or more embodiments, the method includes maintaining, while the mapping information is synchronized, a copy of the header indicating a number of entries associated with the modified region prior to the change in the mapping information.

Various embodiments of a system for storing data are disclosed herein. A system includes a first memory device divided into a plurality of regions. The first memory device is configured to store content data and mapping information between a logical address and a physical address of a corresponding region of the first memory device. The system includes a second memory device coupled to the first memory device. The second memory device is configured to store a plurality of entries. Each entry indicates an update in the mapping information associated with the corresponding region. The second memory device is configured to store a plurality of headers. Each header indicates a number of one or more entries in the corresponding region. The system includes a controller coupled to the first memory device and the second memory device. The controller is configured to generate a copy of the plurality of headers prior to synchronizing the mapping information stored on the first memory device with the update in the mapping information. The controller is configured to update, during synchronization of the mapping information, a header indicating a number of entries associated with a modified region after a change in the mapping information. The controller is configured to maintain, during synchronization of the mapping information, the copy of the header indicating the number of entries associated with the modified region prior to the change in the mapping information.

In one or more embodiments, the first memory device is a non-volatile memory device and the second memory device is a volatile memory device.

In one or more embodiments, the controller is configured to store the copy of the plurality of headers on the second memory device.

In one or more embodiments, the controller is further configured to remove the copy of the plurality of headers in response to completing the synchronization of the mapping information.

Various embodiments of a system for storing data are disclosed herein. The system includes means for generating a plurality of entries, each entry indicating an update in mapping information between a logical address and a physical address for a corresponding region of a memory device. The system includes means for generating a plurality of headers. Each header indicates a number of entries in the corresponding region. The system includes means for generating a copy of the plurality of headers. The system includes means for synchronizing the mapping information stored according to the copy of the plurality of headers and the plurality of entries. The system includes means for removing the copy of the plurality of headers in response to completing synchronization of the mapping information.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Acronyms and other descriptive terminology may be used merely for convenience and clarity and are not intended to limit the scope of the invention.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

Various embodiments of a system and a method for updating mapping information between a logical address and a physical address of a corresponding region of a memory device are disclosed herein. In one aspect, the system allows the mapping information to be synchronized (or backed up) according to previous updates to the mapping information. In one configuration, the system includes a controller that stores entries and headers of the mapping information. Synchronization herein refers to backing up updates to the mapping information represented by headers and entries stored on one memory device by another memory device. Each entry indicates an update to the mapping information associated with a corresponding region of the other memory device. Each header indicates an attribute of entries associated with the corresponding region. For example, a header of a region may indicate a number of entries associated with the region. The mapping information of a region may be synchronized according to the header and one or more entries of the region.

Occasionally, additional updates to the mapping information are received or made during synchronization. In some embodiments, the controller enables these additional updates during the synchronization to be safely recorded. In one aspect, the controller receives a synchronize instruction to perform synchronization of the mapping information. In response to the synchronize instruction, the controller generates a copy of headers. Synchronization of the mapping information is performed based on the copy of headers. In one approach, synchronization is performed according to a number of entries associated with a region as indicated by the header associated with the region. During the synchronization, an update to a region of the memory device may be performed. In response to the update to the region of the memory device, a new entry is generated, and the headers may be updated according to the new entry. The copy of the headers remains unchanged during the synchronization.

Synchronization is performed based on the copy of the headers, and irrespective of any changes to the headers. Accordingly, the additional update to the mapping information during the synchronization can be safely recorded while avoiding a race condition. For example, a copy of a header for a region generated in response to the synchronize instruction indicates that three entries are associated with the region. During the synchronization, two additional entries for the region may be generated according to an update in the region, and the header for the region may be updated to indicate five entries exist for the region. The copy of the header remains unchanged during the synchronization. Irrespective of the update to the header, mapping information for the region may be synchronized according to the three entries indicated by the copy of the header for the region. After completing the synchronization, the copy of the headers may be removed.

Figure 1:
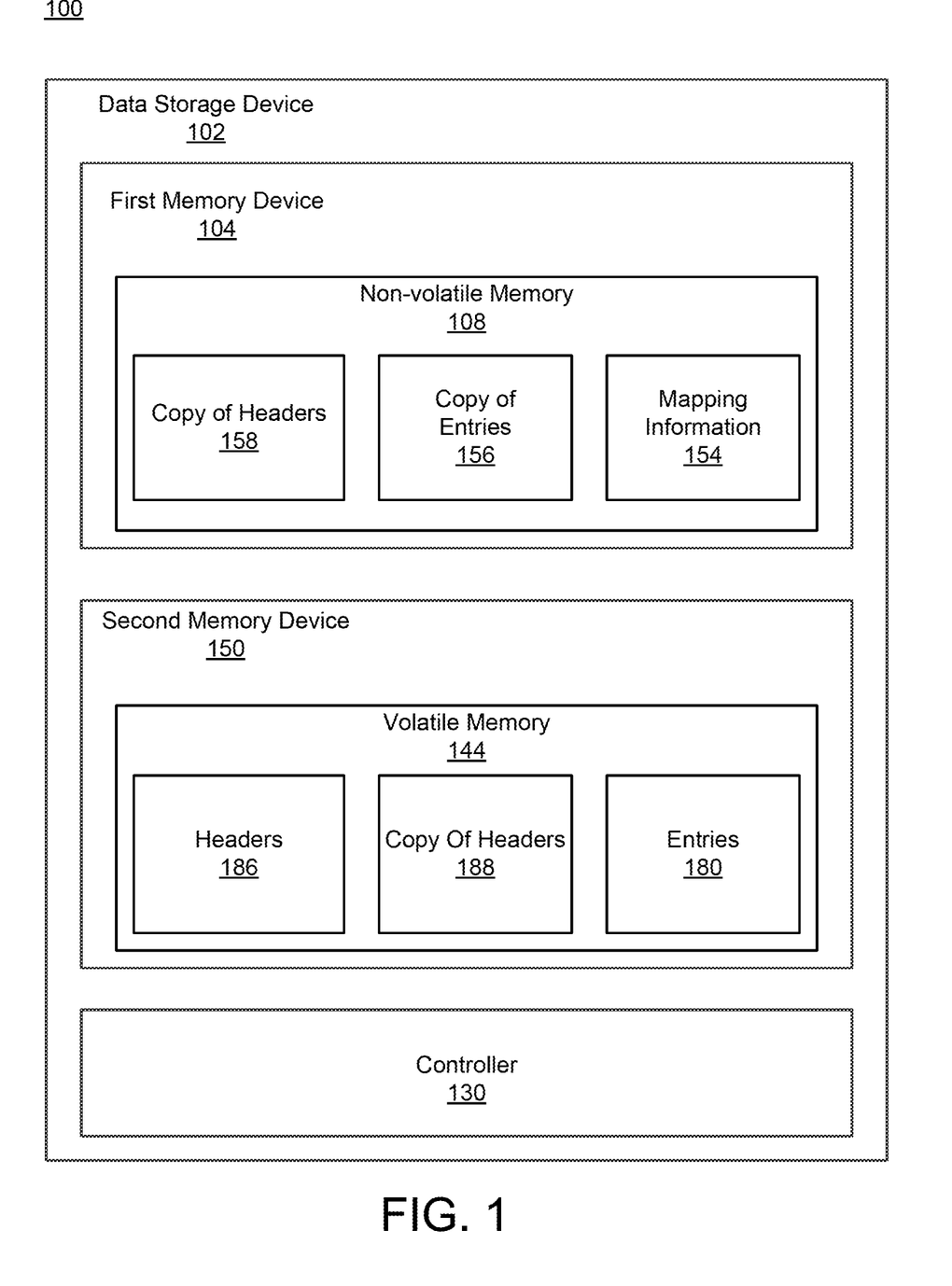
FIG. 1 is a block diagram of a computer system including a memory device according to an example embodiment.

Referring to FIG. 1, a block diagram of a computer system 100 is shown according to an exemplary embodiment. The computer system 100 includes a data storage device 102 for storing data. In one configuration, the data storage device 102 includes a first memory device 104, a second memory device 150, and a controller 130. These components operate together to store content data and control information for operating the first memory device 104. In some embodiments, the data storage device 102 includes more, fewer, or different components than shown in FIG. 1. For example, the controller 130 may include the second memory device 150 or may be integrated with the second memory device 150.

The first memory device 104 is a hardware component that stores content data. In some embodiments, the first memory device 104 is embodied as a semiconductor memory device including one or more volatile memory devices, such as dynamic random access memory (DRAM) or static random access memory (SRAM) devices, non-volatile memory devices, such as resistive random access memory (ReRAM), electrically erasable programmable read only memory (EEPROM), flash memory (which can also be considered a subset of EEPROM), ferroelectric random access memory (FRAM), magnetoresistive random access memory (MRAM), other semiconductor elements capable of storing information, or some combination of them.

The first memory device 104 can be formed from passive and/or active elements, in any combinations and may include a plurality of memory cells. In a non-limiting example, passive semiconductor memory elements include ReRAM device elements, which in some embodiments include a resistivity switching storage element, such as an anti-fuse, phase change material, etc., and optionally a steering element, such as a diode, etc. Further, in another non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. In a non-limiting example, flash memory devices in a NAND configuration (NAND memory) may include memory elements connected in series. The NAND memory array may be configured so that the array includes one or more memory strings in which a string includes multiple memory elements that share a single bit line. Alternatively, memory elements may be configured so that each element is individually accessible, e.g., a NOR memory array. NAND and NOR memory configurations are exemplary, and memory elements may be configured otherwise.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

In a three dimensional NAND memory array, the memory elements may be coupled together to form a NAND string within a single horizontal (e.g., x-z) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

In a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry may be implemented for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It will be recognized that the following is not limited to the two dimensional and three dimensional exemplary structures described but covers all relevant memory structures as described for example herein.

The controller 130 is a circuit or component that controls operations of the first memory device 104 and the second memory device 150. In some embodiments, the controller 130 interfaces with a host device (not shown). From the host device, the controller 130 receives a write instruction to store content data on the first memory device 104 along with the content data to be stored. The write instruction to store content data may specify a logical address of the memory device 104. In response to the write instruction to store the content data, the controller 130 stores the content data at a physical address of the first memory device 104 corresponding to the logical address. The controller 130 stores, on the first memory device 104, mapping information 154 indicating mapping between the logical address and the physical address. Moreover, the controller 130 receives a read instruction to access content data stored on the first memory device 104. The read instruction to access the content data may specify a logical address of the memory device storing the content data. In response to the read instruction to access the content data, the controller 130 obtains the mapping information 154 stored on the first memory device 104, and retrieves the content data stored on the physical address of the first memory device 104 corresponding to the logical address according to the mapping information 154. The controller 130 forwards the retrieved data to the host device.

The second memory device 150 is a hardware component that stores entries 180 and headers 186 of the mapping information 154. Each entry 180 indicates an update in the mapping information 154 of a corresponding region of the first memory device 104. Examples of an entry 180 include "write for host write," "write for relocation," "deallocation (trim)," etc., and an associated logical address, physical address or both for a corresponding region of the first memory device 104. Each header 186 indicates an attribute of entries 180 associated with the corresponding region. For example, a header 186 of a region indicates a number of entries 180 associated with the region.

In one embodiment, the first memory device 104 includes a non-volatile memory 108 divided into a plurality of regions for storing content data and the mapping information 154, and the second memory device 150 includes a volatile memory 144 for storing the entries 180 and the headers 186 corresponding to the mapping information 154. The volatile memory 144 may be faster than the non-volatile memory 108, but may have less storage capacity than the non-volatile memory 108. In some implementations, the controller 130 includes the volatile memory 144 or is integrated together with the volatile memory 144 on a same integrated circuit. Hence, the storage capacity of the volatile memory 144 may be limited. In one approach, the non-volatile memory 108 may store the mapping information 154 and the volatile memory 144 may store the headers 186 and entries 180, because the headers 186 and the entries 180 occupy less storage space than the mapping information 154. Although the example embodiment disclosed herein includes the first memory device 104 having the non-volatile memory 108 and the second memory device 150 having the volatile memory 144, the first memory device 104 and the second memory device 150 may each include any type of memory device.

In some embodiments, the controller 130 synchronizes the mapping information 154 stored on the first memory device 104 according to the headers 186 and the entries 180.

In one aspect, the controller 130 performs synchronization at predetermined times, periodically, in response to receiving a synchronize instruction from a host device, or any combination of them. To perform synchronization, the controller 130 generates a copy of headers 188 and stores the copy of headers 188 on the second memory device 150. A copy of a header 188 is a copy of a corresponding header 186 generated in response to the synchronize instruction. In one aspect, each copy of header 188 indicates a number of entries 180 associated with a corresponding region prior to initiating the synchronization. After generating the copy of headers 188, the controller 130 configures the second memory device 150 to transmit the copy of headers 188 and entries 180 to the first memory device 104. The first memory device 104 stores the received copy of headers 188 as the copy of headers 158 and stores the received entries 180 as the copy of entries 156. In addition, the first memory device 104 synchronizes the mapping information 154 according to the copy of headers 158 and the copy of entries 156 to incorporate any updates in the mapping information 154 as indicated by the copy of entries 156 and the copy of headers 158. Upon completion of synchronizing the mapping information 154 according to the copy of headers 158 and the copy of entries 156, the controller 130 may configure the first memory device 104 to delete the copy of headers 158 and the copy of entries 156.

In one aspect, the controller 130 allows updates on mapping information to be executed and stored during the synchronization of the mapping information 154. The controller 130 may receive an update instruction, for example, from the host device to modify regions of the first memory device 104 while the first memory device 104 is synchronizing the mapping information 154 according to the copy of headers 158 and the copy of entries 156. According to the update instruction, the controller 130 may modify the regions of the first memory device 104. For example, the controller 130 may add, copy, change, relocate, or delete data stored by the regions of the first memory device 104. The controller 130 may generate new entries 180 for the modified regions of the first memory device 104, and update the headers 186 to indicate a change in the attribute of the entries 180 associated with the modified regions during the ongoing synchronization process. The controller 130 stores the new entries 180 and the updated headers 186 on the second memory device 150. Because the mapping information 154 stored on the first memory device 104 is synchronized according to the copy of headers 158 and the copy of entries 156 and irrespective of any updates to the headers 186 and the entries 180, the headers 186 and the entries 180 at the second memory device 150 may be updated without causing a race condition. Moreover, the controller 130 obviates blocking out updates to the mapping information during the synchronization process, thereby allowing an improved throughput to be achieved.

In addition, the controller 130 allows mapping information for different regions to be identified and synchronized in an efficient manner. For example, each of the entries 180 and headers 186 is associated with a corresponding region of the first memory device 104. In one aspect, the mapping information 154 may occupy a large amount of storage space (e.g., megabytes), whereas each of the entries 180 and headers 186 occupy a small amount of storage space (e.g., a few bytes or kilobytes). The controller 130 may identify and backup only a portion of the mapping information associated with corresponding regions of the first memory device 104 according to the copy of the headers and entries of the corresponding regions. Thus, the controller 130 may enable the storage amount and computation resources to be conserved by synchronizing only a portion of the mapping information for a corresponding region rather than the entire mapping information.

Figure 2:
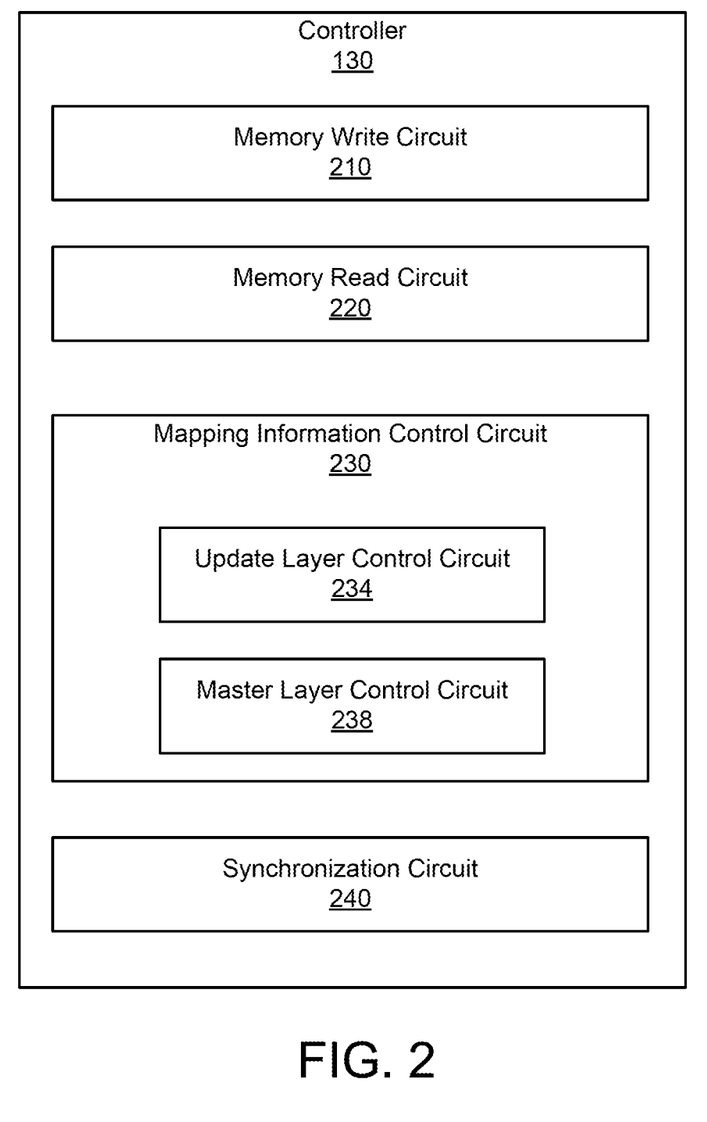
FIG. 2 shows a block diagram of the controller of FIG. 1 for updating mapping information according to an exemplary embodiment.

Referring to FIG. 2, illustrated is a block diagram of a controller 130 of FIG. 1 for updating mapping information according to an exemplary embodiment. In one embodiment, the controller 130 includes a memory write circuit 210, a memory read circuit 220, a mapping information control circuit 230, and a synchronization circuit 240. These components operate together to control data stored on the first memory device 104. In other embodiments, the controller 130 may include more, fewer, or different components than shown in FIG. 2.

The memory write circuit 210 is a circuit that writes data at the first memory device 104. In one approach, the memory write circuit 210 receives a write instruction from a host device to store content data. The write instruction to store may specify a logical address of the memory device. In response to the write instruction to store the content data, the memory write circuit 210 stores the content data at the physical address of the first memory device 104 corresponding to the logical address. The memory write circuit 210 may generate an entry 180 indicating "write for host write" and mapping between the logical address and a corresponding physical address of a region of the first memory device 104.

The memory read circuit 220 is a circuit that retrieves stored data from the first memory device 104. In one approach, the memory read circuit 220 receives a read instruction to access content data stored on the first memory device 104. The read instruction to access content data may specify a logical address of the memory device storing the content data. In response to the read instruction to access the content data, the memory read circuit 220 retrieves the content data stored on the physical address of the first memory device 104 corresponding to the logical address, and forwards the retrieved data to the host device.

The mapping information control circuit 230 is a circuit that controls mapping information. In some embodiments, the mapping information control circuit 230 includes an update layer control circuit 234 and a master layer control circuit 238. The update layer control circuit 234 generates entries 180 and headers 186, and stores the entries 180 and the headers 186, for example, on the second memory device 150 of FIG. 1. The master layer control circuit 238 generates mapping information 154, and stores the mapping information 154, for example, on the first memory device 104 of FIG. 1. In other embodiments, the mapping information control circuit 230 includes more, fewer, or different components than shown in FIG. 2.

The update layer control circuit 234 is a circuit that generates entries 180 and headers 186 of mapping information. In some embodiments, the update layer control circuit 234 is considered means for generating a plurality of entries, and means for generating a plurality of headers. A collection of the entries 180 may be referred to as "an update layer" or "uLayer." In one approach, the update layer control circuit 234 generates an entry 180, in response to receiving a write instruction to store data or an update instruction to modify a particular region of the first memory device 104. In another approach, the update layer control circuit 234 automatically determines a region of the first memory device 104 being updated, and generates the entry 180 associated with the region. The update layer control circuit 234 further generates a header 186 associated with the region for the new entry 180. The update layer control circuit 234 may count a number of entries 180 associated with the region, and generate the header 186 indicating the counted number of entries 180 associated with the region. The update layer control circuit 234 may store the entries 180 and the headers 186 on the second memory device 150.

The master layer control circuit 238 is a circuit that generates control information for controlling data stored on the first memory device 104. The control information includes mapping information 154 between logical addresses and physical addresses of the first memory device 104. The master layer control circuit 238 may generate and store the mapping information for all regions of the first memory device 104. The mapping information 154 includes "a master layer" or "mLayer," where the master layer includes a plurality of "mSets." An mSet is data indicating changes occurred for a predetermined time period or a complete history of changes in mapping between the logical address and the physical address for a corresponding region of the first memory device 104. In one example, mLayer is arranged as an array of physical addresses, where the array is indexed by logical addresses. The array may be divided into a plurality of mSets, where each mSet includes or corresponds to a plurality of entries. For example, each entry has 4 bytes of data, and 8000 entries constitute a single mSet.

The synchronization circuit 240 is a circuit that synchronizes the mapping information 154. In some embodiments, the synchronization circuit 240 is considered means for generating a copy of the plurality of headers and means for synchronizing the mapping information stored according to the copy of the plurality of headers and the plurality of entries. The synchronization circuit 240 performs synchronization at predetermined times, periodically, or in response to a synchronize instruction to synchronize the mapping information 154. In one approach, prior to initiating synchronization, the synchronization circuit 240 generates a copy of headers 188 and stores the copy of headers 188 on the second memory device 150, for example, in response to a synchronize instruction. After generating the copy of headers 188, the synchronization circuit 240 configures the second memory device 150 to transmit the copy of headers 188 and entries 180 to the first memory device 104. The synchronization circuit 240 may configure the master layer control circuit 238 to store the copy of headers 158 and the copy of entries 156 on the first memory device 104, and synchronize the mapping information 154 according to the copy of headers 158 and the copy of entries 156. In one approach, the master layer control circuit 238 modifies the mapping information 154 to incorporate any updates indicated by the copy of entries 156 and the copy of headers 158. Upon completion of synchronizing the mapping information 154 according to the copy of headers 158 and the copy of entries 156, the synchronization circuit 240 may configure the first memory device 104 to delete the copy of headers 158 and the copy of entries 156. The synchronization circuit 240 may also remove the copy of headers 188 stored on the second memory device 150, after completing the synchronization. In some embodiments, the synchronization circuit 240 is considered means for removing the copy of the plurality of headers in response to completing synchronization of the mapping information.

The synchronization circuit 240 enables the entries 180 and the headers 186 to be updated, while the mapping information 154 is synchronized. In one approach, the update layer control circuit 234 receives an update instruction to modify a particular region of the first memory device 104. The update layer control circuit 234 may receive the update instruction from a host device. According to the update instruction, the update layer control circuit 234 generates a new entry to indicate any changes in the mapping information for the particular region, and updates a header 186 associated with the particular region. For example, the update layer control circuit 234 updates the header of a region to indicate an additional entry 180 is generated for the region. In one aspect, the copy of header 188 stored on the second memory device 150 and the copy of header 158 forwarded to the first memory device 104 remain unchanged during the synchronization. Because the synchronization circuit 240 synchronizes the mapping information 154 stored on the first memory device 104 according to the copy of headers 158 and the copy of entries 156, the update layer control circuit 234 may update the entries 180 and the headers 186 without creating a race condition.

Figure 3:
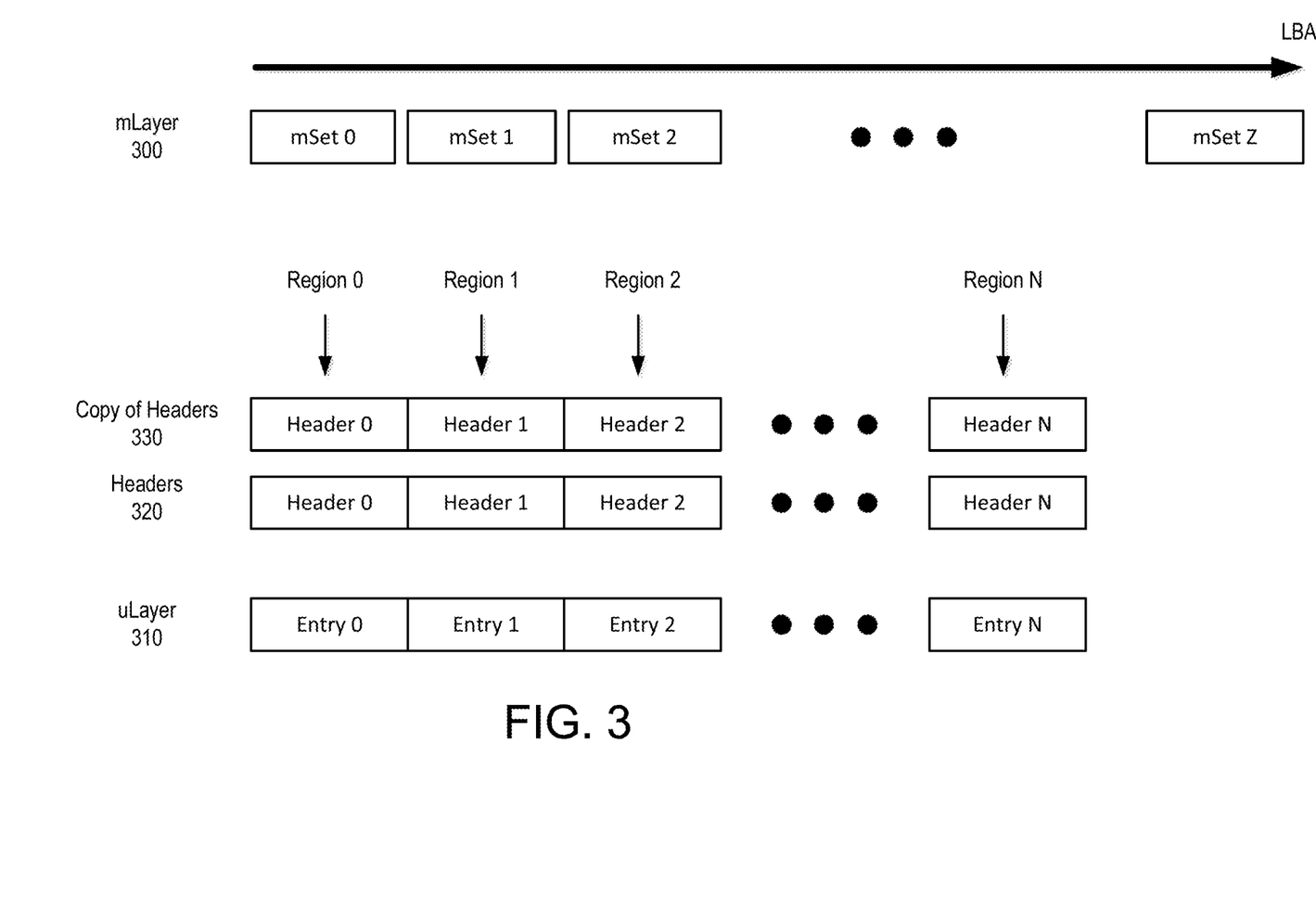
FIG. 3 shows example mapping information and associated data for performing synchronization according to an exemplary embodiment.

Referring to FIG. 3, illustrated is example of updating mapping information according to an exemplary embodiment. In FIG. 3, mLayer 300, copy of headers 330, headers 320, and uLayer 310 are shown. In one approach, the controller 130 stores the mLayer 300 on the first memory device 104 and stores the uLayer 310, the headers 320, and the copy of headers 330 on the second memory device 150. The controller 130 may generate the copy of headers 330 and synchronize the mLayer 300 according to the copy of headers 330 and the uLayer 310 without blocking out updates during the synchronization.

The uLayer 310 is data indicating updates in mapping information between logical addresses and physical addresses of the first memory device 104. In one approach, the uLayer 310 includes a plurality of entries (e.g., Entry 0, Entry 1, Entry 2 . . . Entry N), where each entry is associated with a corresponding region of the first memory device 104. The controller 130 may generate the entries in response to detecting a change in mapping information for a region, or in response to an instruction to change the mapping information. The controller 130 may store the entries on the second memory device 150.

The headers 320 are data indicating attributes of entries associated with corresponding regions. In one example, a header 320 indicates a number of entries associated with the same region. The controller 130 may generate the headers 320 to indicate the new entries generated. The controller 130 may store the headers 320 on the second memory device 150.

In some embodiments, the controller 130 generates the copy of the headers 320 prior to initiating synchronization. In one approach, the controller 130 generates the copy of headers 330 in response to a synchronize instruction to perform synchronization of mapping information and prior to initiating synchronization. The controller 130 may store the copy of headers 330 on the first memory device 104, the second memory device 150, or both. After completing the synchronization, the controller 130 may remove the copy of headers 330.

The mLayer 300 is data indicating mapping information stored on the first memory device 104. The mLayer 300 includes a plurality of mSets (e.g., mSet 0, mSet 1, mSet 2 . . . mSet Z) identified by corresponding logical addresses (LBA), where each mSet is associated with a corresponding region. One or more mSets may be associated with the same region. In response to a synchronize instruction to perform synchronization, the controller 130 may generate the mLayer 300 according to the copy of headers 330 and the uLayer 310 (or a copy of the uLayer 310). The controller 130 may store the mLayer 300 on the first memory device 104. In one aspect, the controller 130 synchronizes the mLayer 300 for one or more regions. The controller 130 may identify regions of copy of headers and entries to be synchronized, and modify one or more mSets associated with the identified regions according to the copy of headers and entries. For example, the controller 130 may determine that a copy of a header 330 associated with a region indicates that there are two entries for the region. According to the copy of header 330, the controller 130 may generate mSet of the region according to the two entries. Other mSets may remain unchanged during synchronization. Hence, the controller 130 may synchronize a portion of the mapping information for regions associated with the copy of headers 330 and the entries, rather than the entire portion of the mapping information.

In some embodiments, the controller 130 allows headers 320 to be updated during the synchronization process. In one approach, the controller 130 receives an instruction to update mapping information for a region of the first memory device 104. The controller 130 may determine the region to be modified, and generate an additional entry for the region of the first memory device 104 according to the update in the mapping information. The controller 130 may modify a header 320 associated with the region to indicate that an additional entry is generated. For example, a counter in the header 320 associated with a region may be increased by a number of new entries associated with the region. Because the synchronization is performed with respect to the copy of headers 330 rather than the headers 320, the uLayer 310 and the headers 320 may be updated during the synchronization in a seamless manner without a race condition.

Figure 4A:
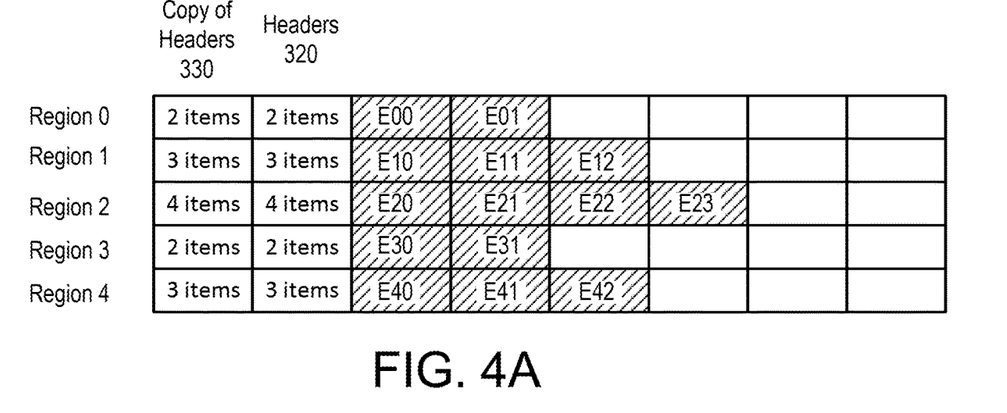
FIG. 4A shows example headers and entries of mapping information prior to synchronizing the mapping information according to an exemplary embodiment.
Figure 4B:
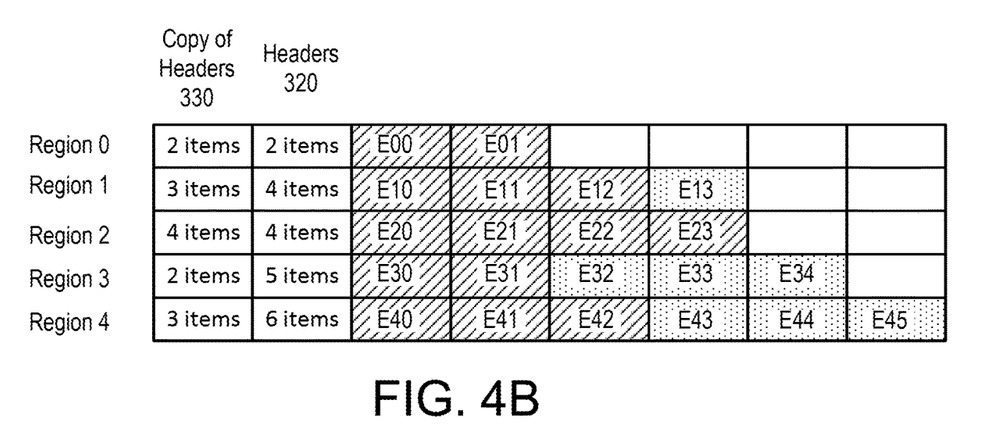
FIG. 4B shows example headers and entries of mapping information with an update to the mapping information during a synchronization of the mapping information according to an exemplary embodiment.
Figure 4C:
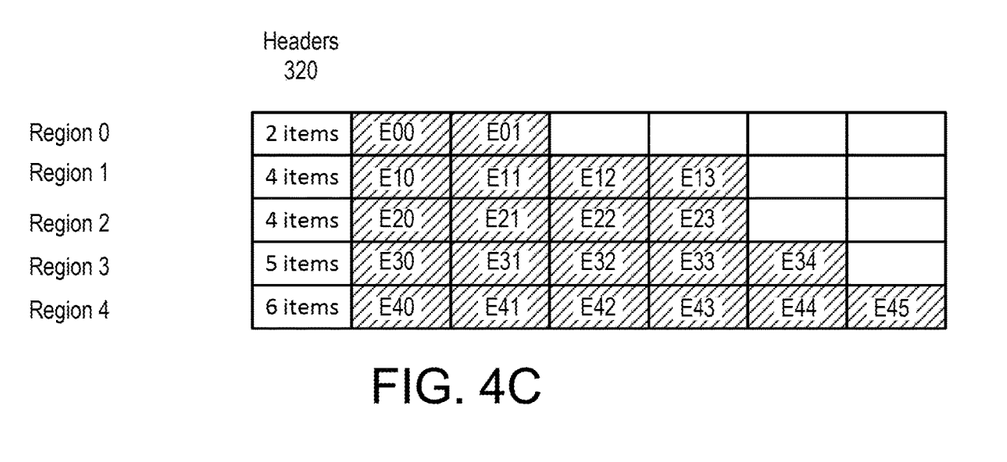
FIG. 4C shows example headers and entries of mapping information after synchronizing the mapping information according to an exemplary embodiment.

Referring to FIGS. 4A through 4C, a process of updating headers 320 and entries EXX of mapping information is illustrated, according to an exemplary embodiment. FIG. 4A illustrates headers 320 and copy of headers 330 generated prior to synchronizing the mapping information. The headers 320 and the copy of headers 330 may be generated in response to a synchronize instruction to perform synchronization and prior to initiating the synchronization. In the example shown in FIG. 4A, each header 320 indicates a number of entries for a corresponding region. Each copy of header 330 is identical to a corresponding header 320 prior to the synchronization. In one aspect, the controller 130 performs synchronization based on the copy of headers 330, rather than the headers 320. Thus, the headers 320 may be updated or modified during the synchronization.

FIG. 4B illustrates additional entries E13, E32, E33, E34, E43, E44, E45 generated, for example, in response to an update instruction to modify a region of a memory device (e.g., the first memory device 104 of FIG. 1) during the synchronization. In the example shown in FIG. 4B, the controller 130 generates a new entry E13 for region 1, new entries E32, E33, E34 for region 3, and new entries E43, E44, E45 for region 4, and updates the headers 320 for the region 1, region 3, region 4. In one aspect, each header 320 indicates a total number of entries for a corresponding region after generating new entries for the region. Meanwhile, the controller 130 maintains the copy of headers 330 unchanged for the region 0 and region 2 during the synchronization, because no updates are made to region 0 and region 2 after initiating synchronization. Hence, each copy of header 330 indicates a number of entries for a corresponding region prior to initiating the synchronization, where each header 320 may indicate a number of entries for a corresponding region after the update in mapping information during the synchronization.

FIG. 4C illustrates headers 320 and entries EXX (after completing the synchronization. The one approach, the controller 130 removes the copy of headers 330 after completing the synchronization.

Figure 5:
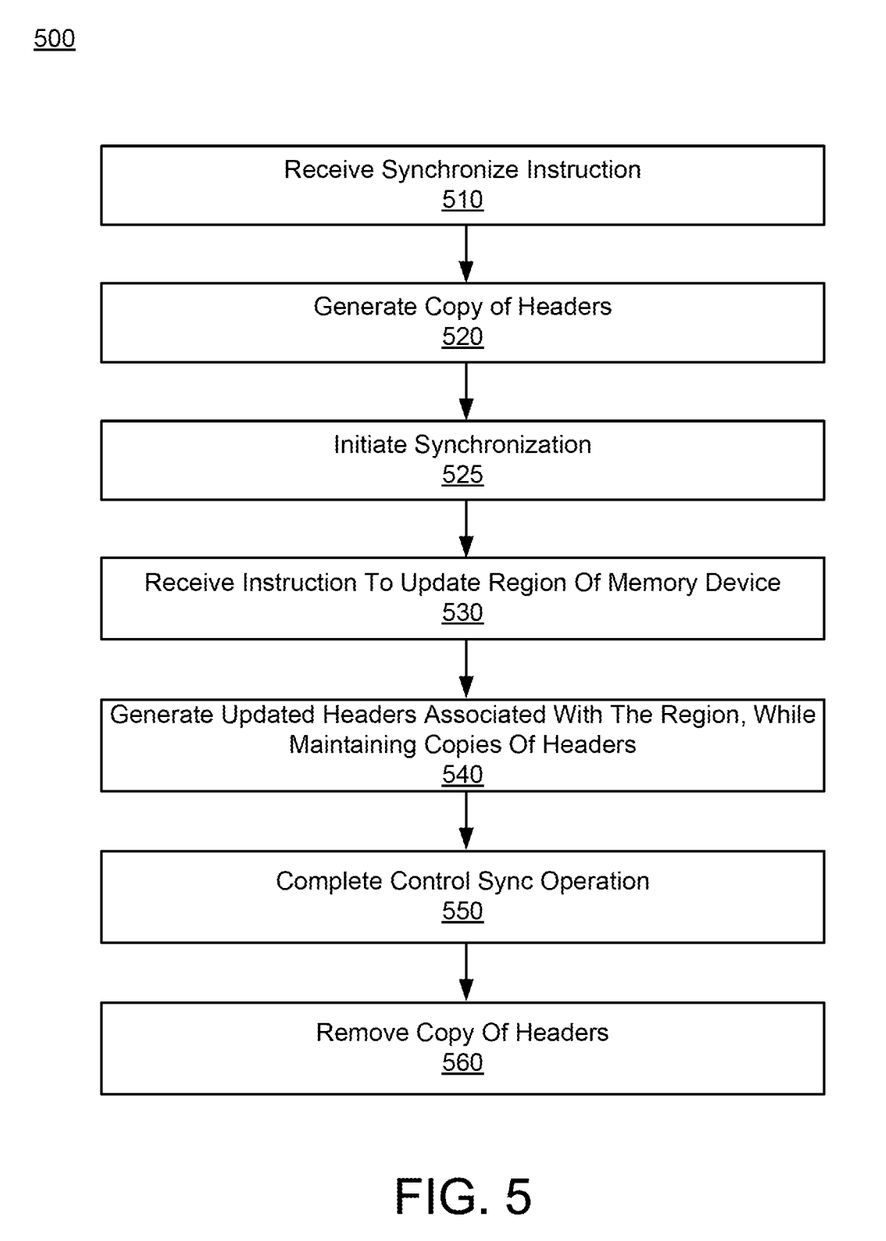
FIG. 5 is a flow chart illustrating a process of updating mapping information between a logical address and a physical address of a corresponding region of a memory device, according to an exemplary embodiment.

Referring to FIG. 5, illustrated is a flow chart showing a process 500 for updating mapping information between a logical address and a physical address of a corresponding region of a memory device, according to an exemplary embodiment. The process 500 may be performed by the controller 130 of FIG. 1. In other embodiments, the process 500 may be performed by other entities such as other components of a memory device or host device. In other embodiments, the process 500 includes more, fewer, or different operations than shown in FIG. 5.

In an operation 510, the controller 130 receives a synchronize instruction to synchronize mapping information between a logical address and a physical address of a memory device. The controller 130 may receive the synchronize instruction from a host device periodically, at predetermined times, upon a request by a user, a combination, or at other times.

In an operation 520, the controller 130 generates a copy of headers, in response to the synchronize instruction. A header may indicate a number of entries associated with a corresponding region of a memory device (e.g., non-volatile memory 108). An entry indicates an update in the mapping information associated with the corresponding region. In some embodiments, the controller 130 stores the headers, the entries, and the copy of headers on another memory device (e.g., volatile memory 144). In other embodiments, the controller 130 stores the headers, the entries, and the copy of headers on a same memory device or on different memory devices. In one aspect, the copy of headers indicates a number of entries for a region of the memory device before performing synchronization.

In an operation 525, the controller 130 initiates synchronization of the mapping information according to the copy of headers and entries after generating the copy of headers. In one approach, the controller 130 determines a number of entries associated with a region based on the copy of headers for the region, and modifies a portion of the mapping information (e.g., mSet) associated with the region to incorporate changes in the mapping information for the region according to the determined entries.

In an operation 530, the controller 130 receives an update instruction to update a region of the memory device during the synchronization. The controller 130 may receive the update instruction from a host device to modify (e.g., add, copy, change, relocate, or delete) data stored by regions of the memory device and change mapping information for the modified regions.

In an operation 540, the controller 130 generates updated headers associated with the particular region in response to the update instruction. In one implementation, the controller 130 maintains copies of headers during the synchronization. The controller 130 also generates new entries according to the update instruction to indicate changes in the mapping information for the corresponding regions. The controller 130 updates the headers of the corresponding regions, such that each header indicates a total number of entries including the new entries for the corresponding regions. The copy of headers may remain unchanged during the synchronization.

In an operation 550, the controller 130 completes the synchronization of the mapping information. In one aspect, the mapping information is updated to incorporate changes or updates as indicated by a copy of entries and headers. In an operation 560, the controller 130 removes the copy of headers after completing the synchronization. The controller 130 may automatically remove the copy of headers after completing the synchronization, or receiving an instruction from the host device to delete the copy of headers after completing the synchronization.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the U.S., or under an analogous statute or rule of law in a foreign jurisdiction, unless the element is expressly recited using the phrase "means for" or, in the case of a method claim, the element is recited using the phrase "step for."

The preceding description is directed to certain implementations for the purposes of describing the innovative aspects of this disclosure. However, a person having ordinary skill in the art will readily recognize that the teachings herein can be applied in a multitude of different ways. The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, directional terms are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A device comprising:
   a memory device divided into a plurality of regions, the memory device configured to store content data and mapping information between a logical address and a physical address of a corresponding region of the memory device; and
   a controller coupled to the memory device, the controller configured to:
   generate a plurality of entries, each entry indicating an update in the mapping information associated with the corresponding region,
   generate a plurality of headers, each header associated with one or more entries in the corresponding region,
   receive an instruction to synchronize the mapping information stored on the memory device with the update in the mapping information,
   generate a copy of the plurality of headers in response to receiving the instruction to synchronize, and
   synchronize the mapping information stored on the memory device according to the copy of the plurality of headers and the plurality of entries.

2. The device of claim 1, wherein each header of the plurality of headers indicates a number of entries in the corresponding region.

3. The device of claim 1, wherein the controller is configured to:
   receive an instruction to modify a region of the memory device while the mapping information is synchronized according to the copy of the plurality of headers and the plurality of entries, and
   generate an entry indicating a change in the mapping information associated with the modified region of the memory device, in response to the instruction to modify the region of the memory device.

4. The device of claim 3, wherein the controller is configured to:
   update, during synchronization of the mapping information, a header indicating a number of entries associated with the modified region after the change in the mapping information.

5. The device of claim 4, wherein the controller is configured to:
   maintain, during synchronization of the mapping information, a copy of the header indicating a number of entries associated with the modified region prior to the change in the mapping information.

6. The device of claim 1, wherein the controller is configured to:
   remove the copy of the plurality of headers in response to completing synchronization of the mapping information stored on the memory device according to the copy of the plurality of headers and the plurality of entries.

7. The device of claim 1, further comprising:
   another memory device coupled to the controller, the another memory device configured to store the plurality of entries and the plurality of headers.

8. The device of claim 7, wherein the memory device comprises a non-volatile memory device and the another memory device comprises a volatile memory device.

9. A method of operating a memory device divided into a plurality of regions, the method comprising:
   generating a plurality of entries, each entry indicating an update in mapping information between a logical address and a physical address for a corresponding region of the memory device;
   generating a plurality of headers, each header indicating a number of entries in the corresponding region;
   generating a copy of the plurality of headers;
   synchronizing the mapping information stored according to the copy of the plurality of headers and the plurality of entries; and
   removing the copy of the plurality of headers in response to completing synchronization of the mapping information stored on the memory device according to the copy of the plurality of headers and the plurality of entries.

10. The method of claim 9, further comprising:
    storing the mapping information on the memory device; and
    storing the plurality of headers and the plurality of entries on another memory device.

11. The method of claim 10,
    wherein the memory device comprises a non-volatile memory device, and
    wherein the another memory device comprises a volatile memory device.

12. The method of claim 10, further comprising:
    receiving an instruction to synchronize the mapping information according to the copy of the plurality of headers and the plurality of entries,
    wherein the copy of the plurality of headers is generated in response to the instruction to synchronize.

13. The method of claim 12, further comprising:
    receiving an instruction to modify a region of the memory device during synchronization of the mapping information according to the copy of the plurality of headers and the plurality of entries; and
    generating an entry indicating a change in the mapping information associated with the modified region of the memory device in response to the instruction to modify the region of the memory device.

14. The method of claim 13, further comprising:
    updating, while the mapping information is synchronized, a header indicating a number of entries associated with the modified region after the change in the mapping information.

15. The method of claim 14, further comprising:
    maintaining, while the mapping information is synchronized, a copy of the header indicating a number of entries associated with the modified region prior to the change in the mapping information.

16. A system comprising:
a first memory device divided into a plurality of regions, wherein the first memory device is configured to store content data and mapping information between a logical address and a physical address of a corresponding region of the first memory device;
a second memory device coupled to the first memory device, the second memory device configured to:
  store a plurality of entries, each entry indicating an update in the mapping information associated with the corresponding region, and
  store a plurality of headers, each header indicating a number of one or more entries in the corresponding region; and
a controller coupled to the first memory device and the second memory device, the controller configured to:
  generate a copy of the plurality of headers prior to synchronizing the mapping information stored on the first memory device with the update in the mapping information,
  update, during synchronization of the mapping information, a header indicating a number of entries associated with a modified region after a change in the mapping information, and
  maintain, during synchronization of the mapping information, the copy of the header indicating the number of entries associated with the modified region prior to the change in the mapping information.

17. The system of claim 16, wherein the first memory device is a non-volatile memory device and the second memory device is a volatile memory device.

18. The system of claim 17, wherein the controller is configured to store the copy of the plurality of headers on the second memory device.

19. The system of claim 16, wherein the controller is further configured to:
remove the copy of the plurality of headers in response to completing the synchronization of the mapping information.

20. A system comprising:
means for generating a plurality of entries, each entry indicating an update in mapping information between a logical address and a physical address for a corresponding region of a memory device;
means for generating a plurality of headers, each header indicating a number of entries in the corresponding region;
means for generating a copy of the plurality of headers;
means for synchronizing the mapping information stored according to the copy of the plurality of headers and the plurality of entries; and
means for removing the copy of the plurality of headers in response to completing synchronization of the mapping information.

\* \* \* \* \*